United States Patent [19]

Tabata et al.

[11] Patent Number: 5,331,629
[45] Date of Patent: Jul. 19, 1994

[54] SYSTEM FOR CONNECTING ISDN TIE LINE VIA ISDN OFFICE LINE

[75] Inventors: Tomio Tabata, Kawasaki; Tomonori Matoba, Nagoya, all of Japan

[73] Assignee: Fujitsu Limited, Kawasaki, Japan

[21] Appl. No.: 982,181

[22] Filed: Nov. 25, 1992

[30] Foreign Application Priority Data

Nov. 26, 1991 [JP] Japan .................... 3-336151

[51] Int. Cl.$^5$ .............................. H04L 29/10
[52] U.S. Cl. ..................... 370/57; 370/110.1
[58] Field of Search ........... 370/15, 49.5, 97, 99, 370/110.1, 55

[56] References Cited

U.S. PATENT DOCUMENTS

| | | | |
|---|---|---|---|
| 5,040,170 | 8/1991 | Upp et al. | 370/99 |
| 5,185,741 | 2/1993 | Iguchi et al. | 370/110.1 |
| 5,195,087 | 3/1993 | Bennett et al. | 370/110.1 |
| 5,204,860 | 4/1993 | Sparks | 370/110.1 |

Primary Examiner—Benedict V. Safourek

[57] ABSTRACT

An ISDN tie line connecting system connects an ISDN tie line between two private branch exchanges via an ISDN office line using an ISDN primary rate interface. The ISDN tie line connecting system includes a tie line interface, a provisional interface for connecting an office line interface, and an interface loop-back part which is coupled to each private branch exchange. The interface loop-back part carries out a conversion between the tie line interface and the provisional interface with respect to the ISDN primary rate interface.

8 Claims, 8 Drawing Sheets

PRIMARY RATE INTERFACE

PRIMARY RATE INTERFACE

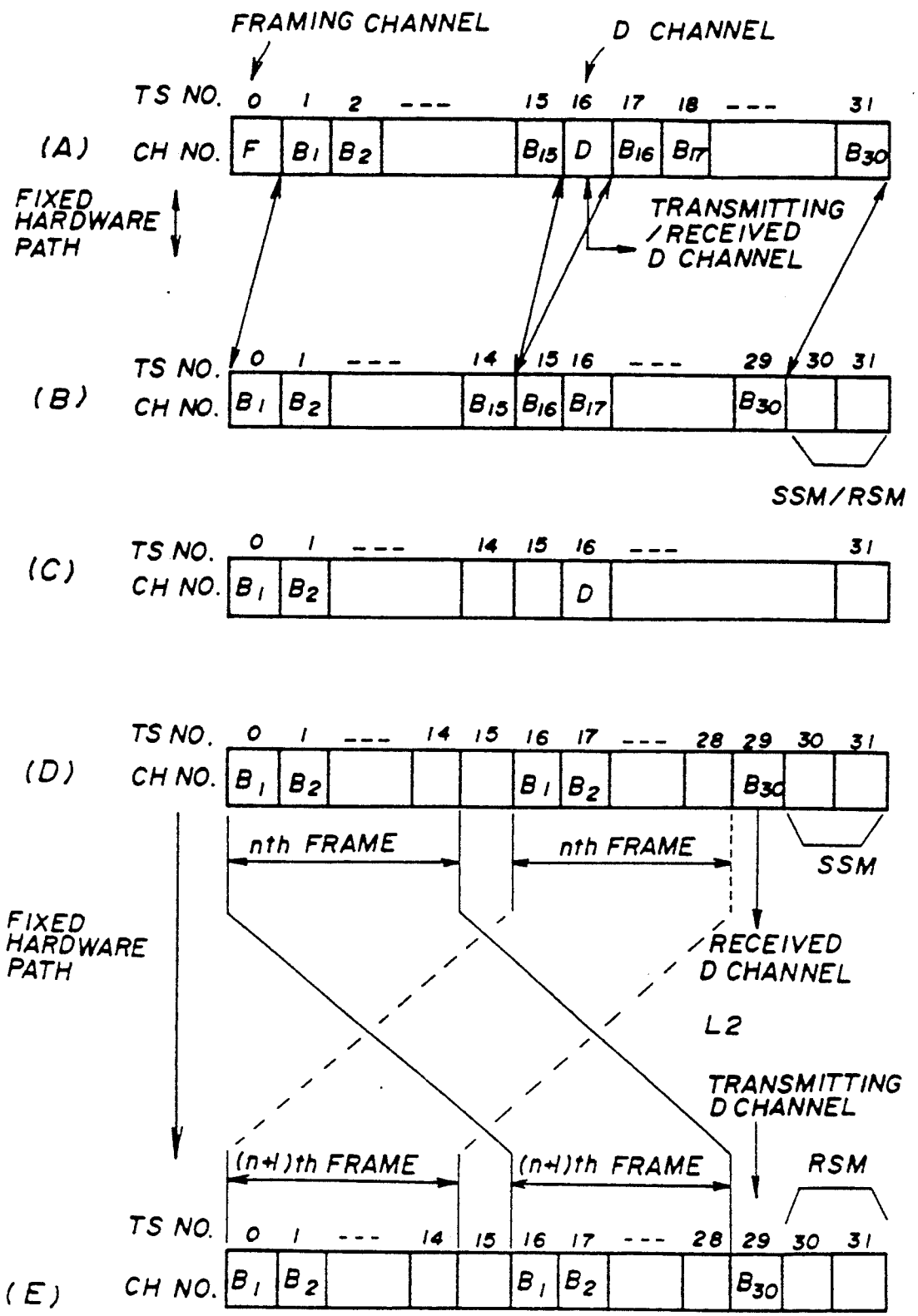

SYSTEM FOR CONNECTING ISDN TIE LINE VIA ISDN OFFICE LINE

BACKGROUND OF THE INVENTION

The present invention generally relates to ISDN (integrated services digital network) tie line connecting systems, and more particularly to an ISDN tie line connecting system which connects the ISDN tie line via an ISDN office line.

Recently, due to the spread of services of the ISDN public network, there are demands to realize services of a primary rate interface by a private branch exchange in office lines (public network) and tie lines (private network). Such services are beginning to be used in general applications.

According to such services, it is possible to exchange more information between stations when compared to the conventional analog connections. Hence, it is possible to realize additional services such as high-speed data communication, number display of other party, and automatic calling.

FIG. 1 shows an example of a network and a primary rate interface of each apparatus in a conventional primary rate interface office line (public network). FIG. 2 shows an example of a network and a primary rate interface of each apparatus in a conventional primary rate interface tie line (private network).

In FIG. 1, a private branch exchange (PBX) 2 includes a primary rate interface (PRI) digital office line interface circuit (PRC) 4 for ISDN, a main control unit (central processing unit or CPU) 5, a main memory unit (MEM) 6 and a terminal 7. The PRC 4 of each PBX 2 is connected to an ISDN public network 3.

On the other hand, in FIG. 2, a PBX 2 includes a PRI (primary rate interface trunk or PRT) circuit 8 for tie line, a transmitter (TRNS) connected to the PRT circuit 8, a main control unit (CPU) 5, a main memory unit (MEM) 6 and a terminal 7. The TRNS 9 of the PBX 2 is connected to the TRNS 9 of the remote PBX 2 via the tie line. The TRNS 9 enables connection of remote PBXs 2.

When connecting a call, the communication is made by making the B channels and the D channel of each PRI (30B+D) correspond 1:1 between the apparatuses as indicated by (iii) and (iv) in FIG. 1 and as indicated by (viii) and (ix) in FIG. 2. The actual communication information (data) is exchanged between the apparatuses of the network in each B channel. On the other hand, the control information for controlling the connection of the communication information is exchanged between the apparatuses of the network in the D channel.

The communication information is exchanged as it is between the apparatuses of the network in each B channel. However, in the case of the PRI office line of FIG. 1, the D channel is used by converting it into the D channel of the PRI digital office line interface for the ISDN in the PRC 4 as indicated by (iii) in FIG. 1, and by converting it into the D channel of the ISDN public network in the ISDN public network 3 as indicated by (iv) in FIG. 1.

On the other hand, in the case of the PRI office line of FIG. 2, the D channel is used by converting it into the D channel of the PRI for the office line in the PRI 8 as indicated by (viii) in FIG. 2, and by converting it into the D channel of the transmitter 9 in the transmitter 9 as indicated by (ix) in FIG. 2.

Accordingly, the input and output of the PBX 2 can be made via the same PRI, but mutually different connections must be made for the case where the office line is used and for the case where the tie line is used. Hence, it is possible to effectively utilize the PRI for the case where the office line is used and for the case where the tie line is used, by making both of the connections on a common line connection.

However, the conventional ISDN tie line connecting system using the ISDN office line requires different types of connections between the PBX and the public network and between the PBXs due to the different standard restrictions, and for this reason, it is impossible to connect the public network and the private network.

Therefore, the connection of the PBX to the ISDN public network and the connection of the PBX to the private network must be made independently. As a result, although various useful functions are realized, the system is not efficient and the cost of the service is high.

On the other hand, the PRI provides a plurality of channels, such as 23 or 30 channels, in one interface. Hence, if the PRI is used with a PBX having a relatively small capacity, there is no need to use all of the channels provided, and as a result, a relatively large number of unused channels exist within one PRI. In other words, if the ISDN public network connection using the PRI and the private network connection using the PRI are used simultaneously in the PBXs having the relatively small capacity, there is a problem in that a large part of the PRIs are unused and wasted.

The following two methods are conceivable as methods of solving the above described problem.

According to a first method (a), the information of the digital tie line is exchanged in the D channel which is used in the ISDN public network.

According to a second method (b), the information of the digital tie line is exchanged in the B channels used in the ISDN public network.

However, the service provided by the first method (a) is dependent on the information transmission capability of the D channel of the ISDN public network. For this reason, the quality of the service deteriorates compared to the case where the direct connection is employed.

On the other hand, the following methods are conceivable as the second method (b). That is, it is conceivable (b1) to control the generation and exchange of the D channel information by the main control program of the PBX or, (b2) to loop back the digital tie line interface to the switch network of the system so as to connect to the ISDN network.

However, the method (b1) must exchange the D channel data by a high-speed data communication which cannot be fully supported by the main control program of the PBX, and the system structure of the existing PBX itself must be modified. The method (b2), on the other hand, only requires a loop-back connection circuit on an external interface circuit of the PBX and a fixed connection within the PBX. Accordingly, this method (b2) is more promising compared to the methods (a) and (b1), and it would be convenient if such a method (b2) could be realized.

SUMMARY OF THE INVENTION

Accordingly, it is a general object of the present invention to provide a novel and useful ISDN tie line connecting system which connects via an ISDN office line, in which the problem described above is eliminated and the method (b2) is realized.

Another and more specific object of the present invention is to provide an ISDN tie line connecting system which connects an ISDN tie line between two private branch exchanges via an ISDN office line using an ISDN primary rate interface, comprising a tie line interface, a provisional interface for connecting an office line interface, and an interface loop-back part, coupled to each private branch exchange, for carrying out a conversion between the tie line interface and the provisional interface with respect to the ISDN primary rate interface. According to the ISDN tie line connecting system of the present invention, it is possible to improve the line utilization efficiency because the primary rate interface tie line can be used by using the primary rate interface office line in common. As a result, there is no need to set up independent equipments for the digital office line and the tie line, thereby making it possible to provide inexpensive services.

Other objects and further features of the present invention will be apparent from the following detailed description when read in conjunction with the accompanying drawings.

BRIEF DESCRIPTION OF THE DRAWINGS

FIG. 8 is a diagram for explaining the channel allocation.

DESCRIPTION OF THE PREFERRED EMBODIMENTS

Figure 1:
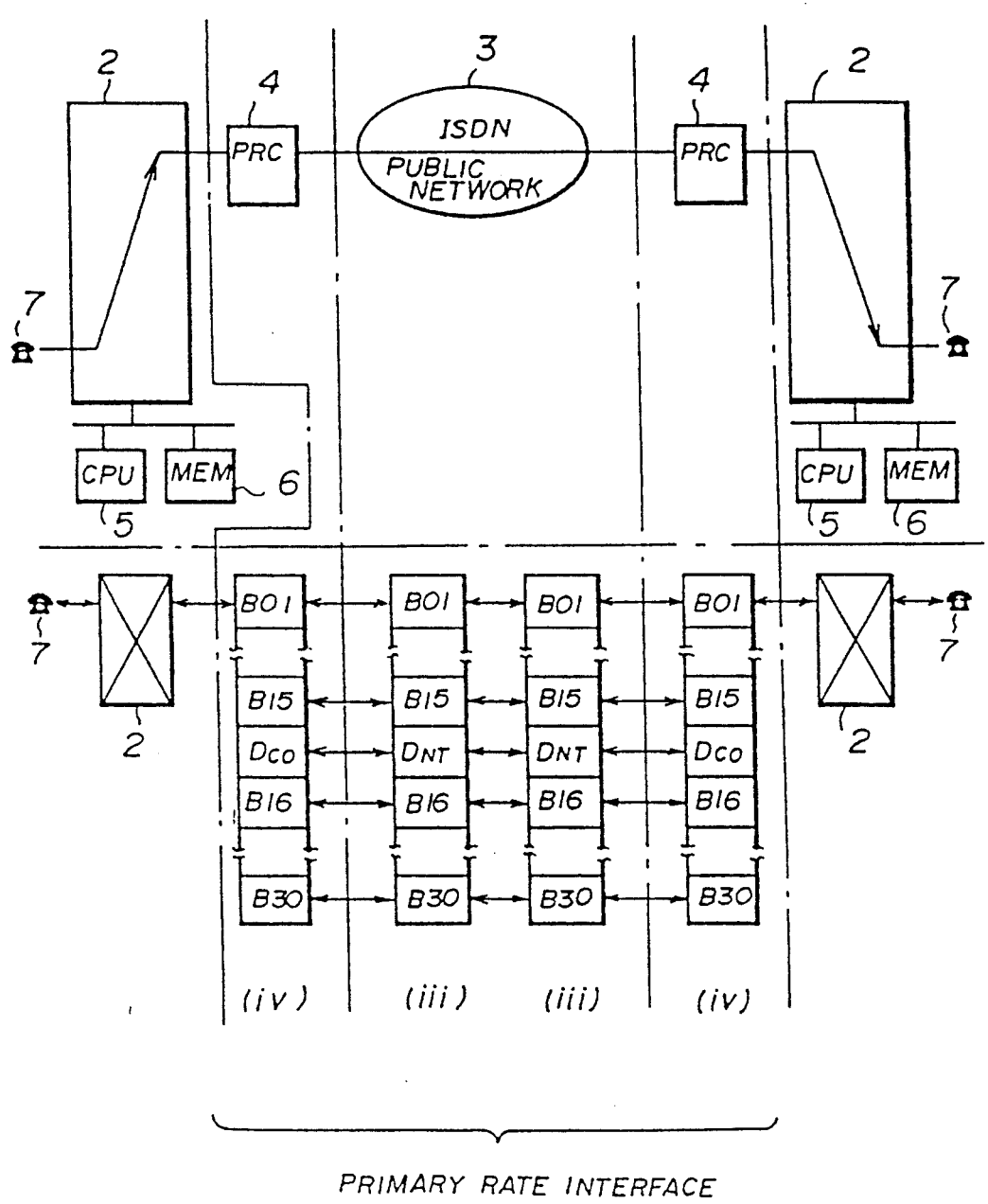
FIG. 1 is a system block diagram showing an example of a network and a primary rate interface of each apparatus in a conventional primary rate interface office line (public network)
Figure 2:
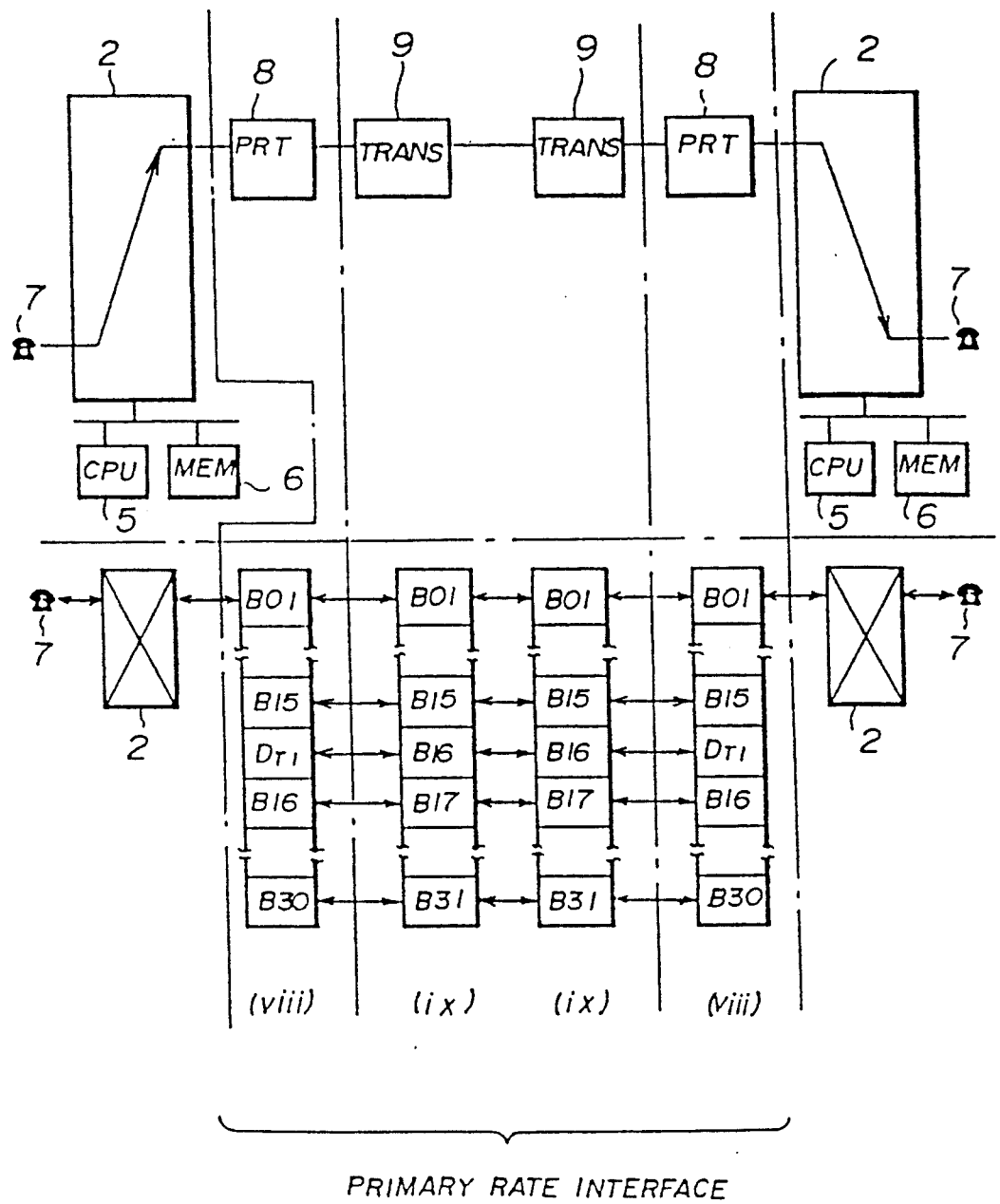
FIG. 2 is a system block diagram showing an example of a network and a primary rate interface of each apparatus in a conventional primary rate interface tie line (private network)
Figure 3:
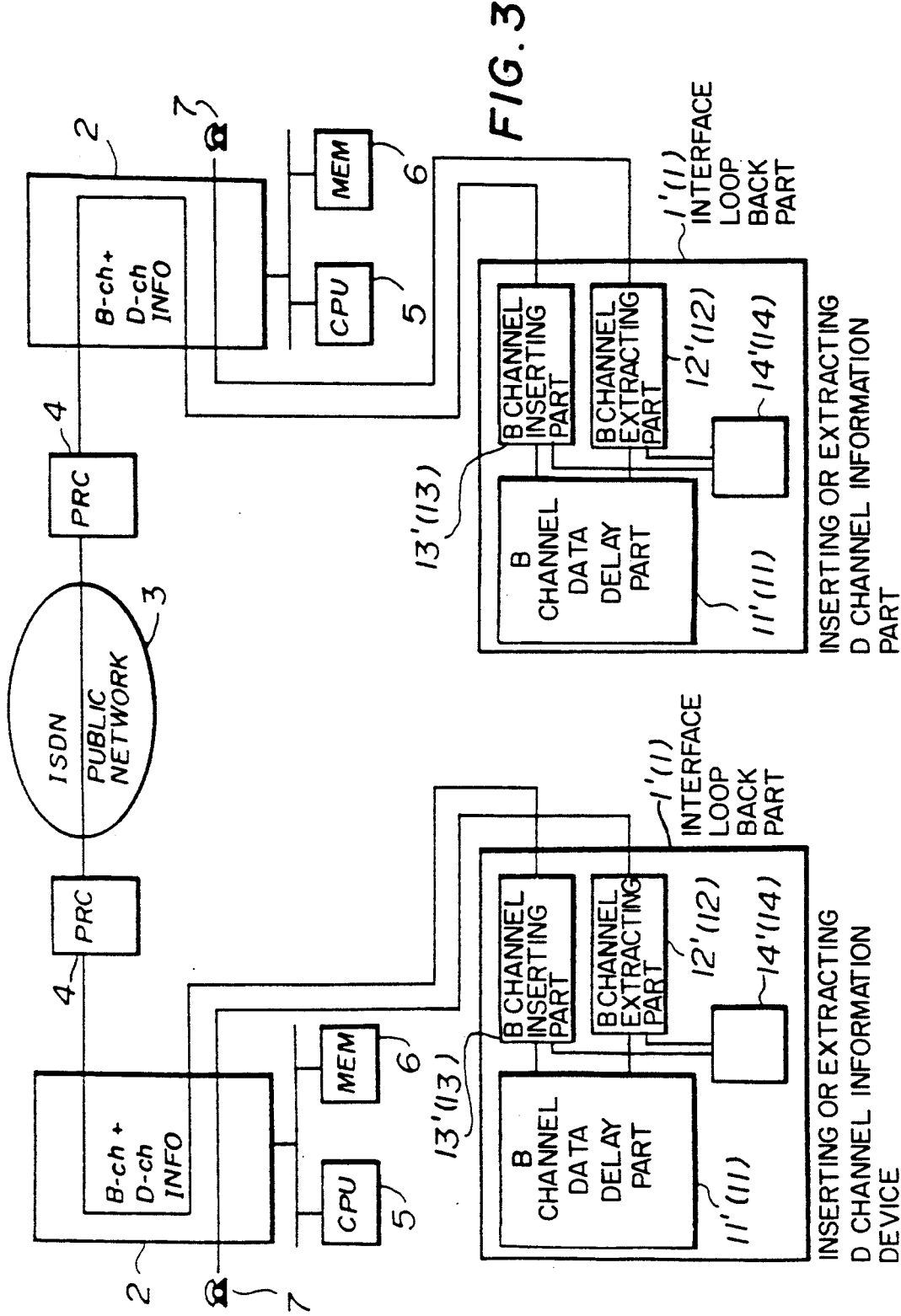
FIG. 3 is a system block diagram for explaining the operating principle of the present invention.

First, a description will be given of the operating principle of the present invention, by referring to FIG. 3. In FIG. 3, a PBX 2 includes a PRI digital office line interface circuit (PRC) 4 for ISDN, a main control unit (CPU) 5, a main memory unit (MEM) 6 and a terminal 7. The PRC 4 of each PBX 2 is connected to an ISDN public network 3. Each PBX 2 is provided with an interface loop-back part 1'.

According to one aspect of the present invention, this interface loop-back part 1' carries out a conversion between the tie line interface and the provisional interface for connecting the office line interface in the PRI. The interface loop-back part 1' includes a B channel data extracting part 12', a B channel data delay part 11' and a B channel data inserting part 13'.

For example, the B channel data extracting part 12' extracts the individual B channel data, and the B channel data delay part 11' delays the B channel data which is extracted by the B channel data extracting part 12'. In addition, the B channel data inserting part 13' inserts the B channel data which is delayed by the B channel data delay part 11' into the output highway of the B channel data.

Furthermore, the interface loop-back part 1' may provided with a means 14' for inserting or extracting D channel information with respect to one B channel when the interface loop-back part 1' carries out the conversion between the tie line interface and the provisional interface in the PRI.

According to another aspect of the present invention, the block system is the same as that shown in FIG. 3. But in this case, an interface loop-back part 1 is provided in place of the interface loop-back part 1'.

The loop-back part 1 carries out a conversion between the tie line interface and the provisional interface by using approximately half of the PRI as the tie line interface and the remaining part as the provisional interface for connecting the office line interface. This interface loop-back part 1 includes a B channel data extracting part 12, a B channel data delay part 11, and a B channel data inserting part 13.

For example, the B channel data extracting part 12 extracts approximately half of the individual B channel data with respect to the PRI, and the B channel data delay part 11 delays the B channel data which is extracted by the B channel data extracting part 12 to the remaining approximately half of the PRI. In addition, the B channel data inserting part 13 inserts the B channel data which is delayed by the B channel data delay part 11 into the output highway of the B channel data, and is identical to the B channel data inserting part 13'.

Furthermore, the interface loop-back part 1 may provided with a means 14 for inserting or extracting D channel information with respect to one B channel when the interface loop-back part 1 carries out the conversion between the tie line interface and the provisional interface in the PRI by using approximately half of the PRI as the tie line interface and the remaining part of the PRI as the provisional interface.

Figure 4:
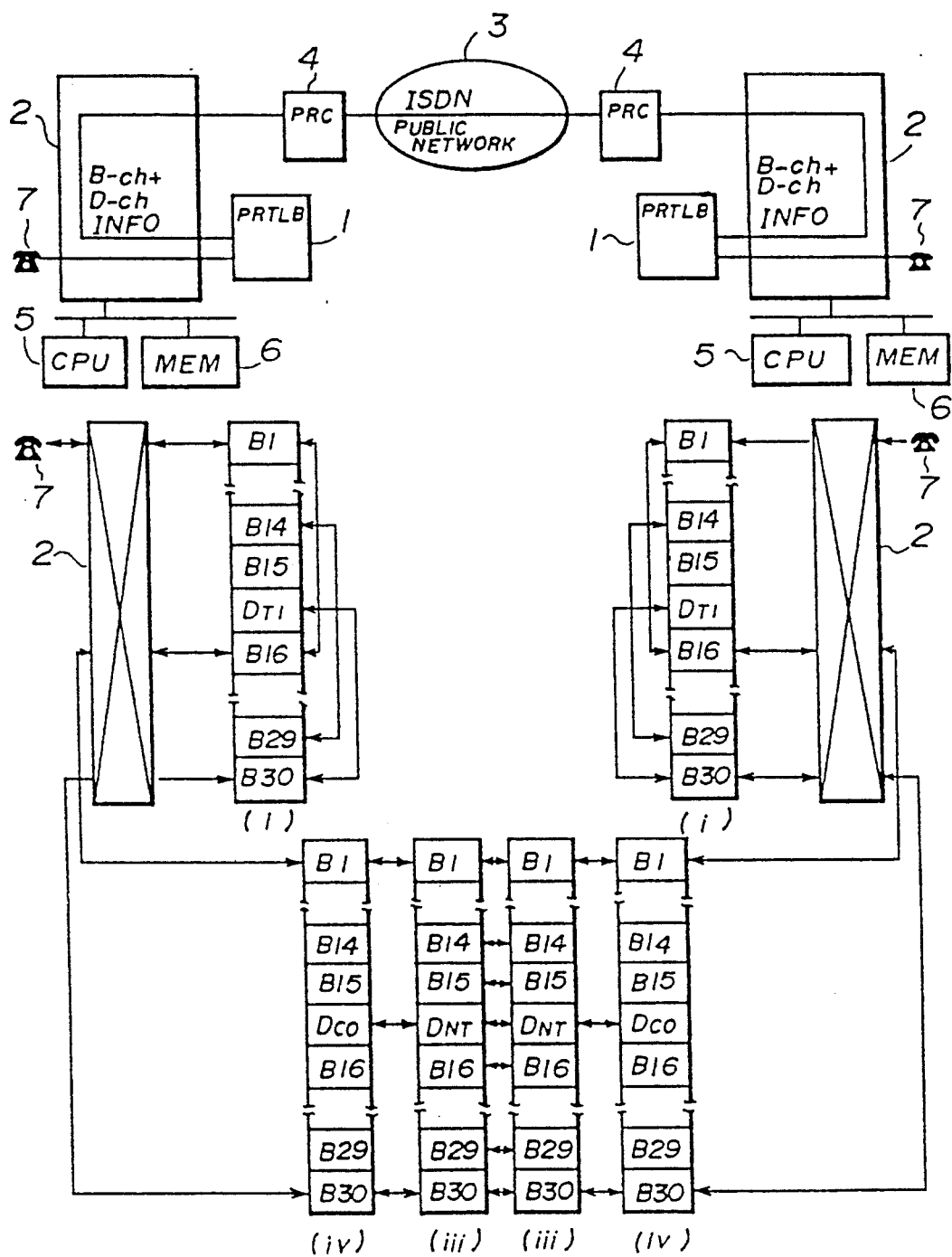
FIG. 4 is a system block diagram showing an essential part of embodiment of an ISDN tie line connecting system according to the present invention.

Next, a description will be given of an embodiment of an ISDN tie line connecting system according to the present invention, by referring to FIG. 4. In FIG. 4, those parts which are the same as those corresponding parts in FIG. 3 are designated by the same reference numerals, and a description thereof will be omitted. In this embodiment, the PRI digital office line interface circuit (PRC) 4 for ISDN is used for the connection of the PBX 2 and the ISDN public network 3.

The following two methods are conceivable as methods of connecting the PRI tie line to the PRC 4 which is connected to the public network. According to a first conceivable method, the connection is made outside the PBX. On the other hand, according to a second conceivable method, the connection is made via the switching network of the PBX. In this embodiment, the second conceivable method is employed for the following reasons.

In the case of the first conceivable method, the interface connection is made time divisionally. However, it is difficult to divide the connections by partially using the channels of the interface, that is, it is difficult to divide and use the PRI connection from the PBX and the tie line connection from the outside. As a result, it is inevitable to exclusively use the connection, that is, connect the tie line directly to the office line.

On the other hand, according to the second conceivable method, a channel for connecting to the PRI office line is further provided to the tie line connection which is treated by the conventional ISDN PRI digital tie line interface. Because the position of the D channel is fixed in the PRI, a reassembling is made so as to be connectable to the position of the B channel of the PRI, thereby connecting the PBX to the network. Hence, the connection to the PRI office line can be made in a flexible manner.

In FIG. 4, each PBX 2 includes a main control unit (CPU) 5, a main memory unit (MEM) 6, a terminal 7, a PRC 4, and an interface loop-back part 1. In addition, the PRC 4 of each PBX 2 is connected to each other via the ISDN public network 3.

The PBX 2 is an in-plant exchange for connecting two PBXs 2 via the ISDN office line using the PRI of the ISDN. The CPU 5 and the main memory unit 6 control the operation of the PBX 2. The PRC 4 connects the PBX 2 to the ISDN public network 3.

The interface loop-back part 1 loops back the digital tie line interface and the B channels. The interface loop-back part 1 also inserts or extracts the D channel information with respect to one B channel. In other words, the interface loop-back part 1 carries out a conversion between the tie line interface and the provisional interface as indicated by (i) in FIG. 4, using approximately half of the PRI as the tie line interface and the remaining part as the provisional interface for connecting the office line interface.

Figure 5:
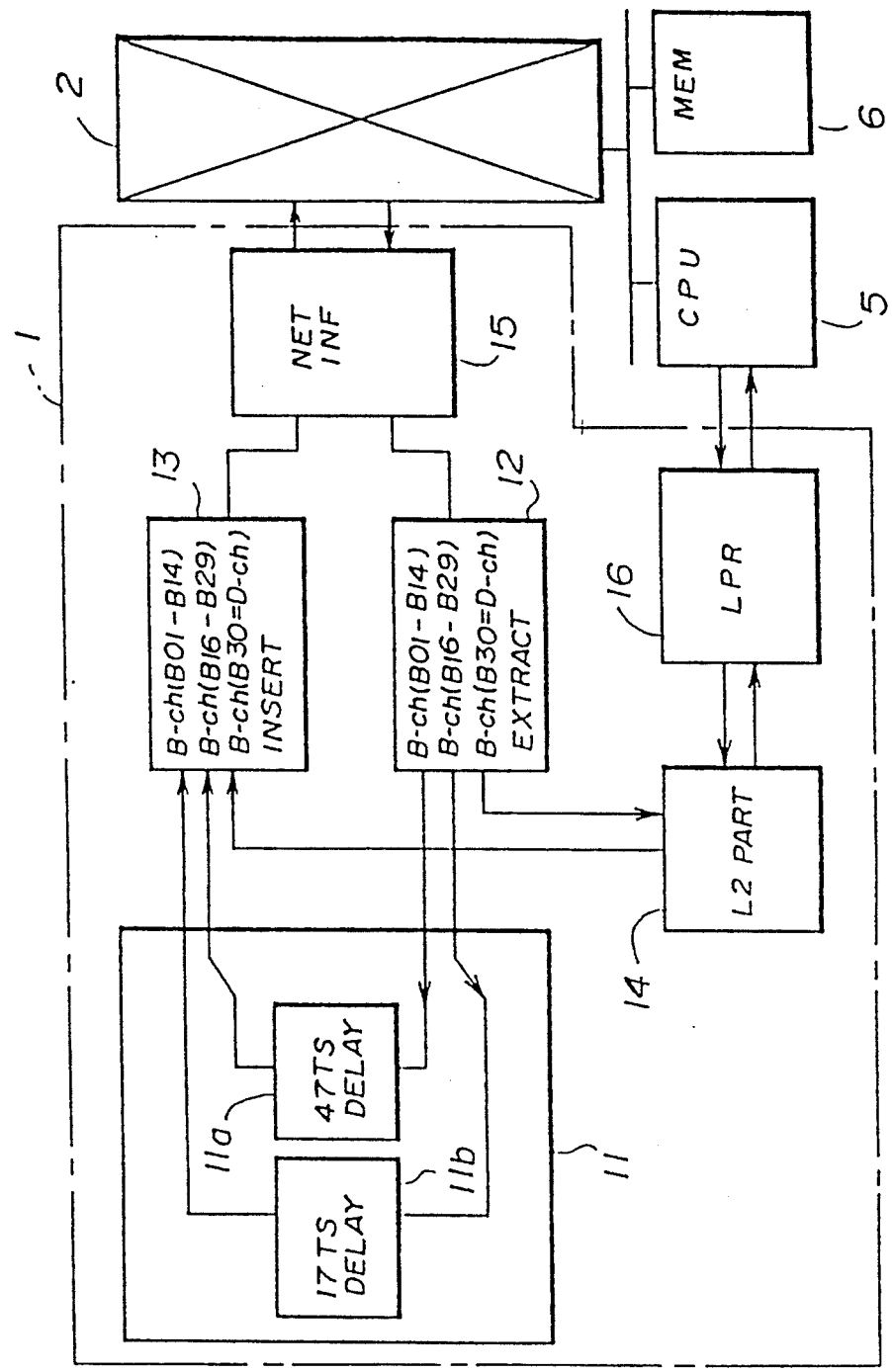
FIG. 5 is a system block diagram showing an embodiment of an interface loop-back part.

As shown in FIG. 5, the interface loop-back part 1 includes a B channel reassembling part (B channel data delay part) 11, a B channel data extracting part 12, a B channel data inserting part 13, a digital tie line layer 2 (L2) part (D channel information insertion/extraction part) 14, a highway interface circuit 15, and a line processor (LPR) 16. In FIG. 5, the PBX 2, the CPU 5 and the main memory unit 6 are the same as those shown in FIG. 4.

The highway interface circuit 15 connects the B channels to the network body. The B channel data extracting part 12 extracts approximately half the B channel data (amounting to 14 channels, for example) individually with respect to the PRI from the highway interface circuit 15, and transmits the extracted B channel data to the B channel reassembling part 11. In addition, the B channel data extracting part 12 extracts the B channels and the D channel of the PRI from the highway interface circuit 15, and transmits the extracted D channel to the digital tie line L2 part 14.

The B channel reassembling part 11 delays the B channel data extracted by the B channel data extracting part 12 into the remaining approximately half of the PRI. In other words, the B channel reassembling part 11 delays the B channels B1 through B14 as indicated by (i) in FIG. 4, so as to successively and respectively shift the data of these B channels B1 through B14 into the B channels B16 through B29 having no data. For this reason, the B channel reassembling part 11 is made up of a 47TS delay circuit 11a and a 17TS delay circuit 11b as shown in FIG. 5.

First, the 47TS delay circuit 11a delays the data of the B channels B11 through B14 of the PRI from the B channel extracting part 12 by 47 time slots (47TS). In addition, the 17TS delay circuit 11b delays the data of the B channels B16 through B29 of the PRI by 17 time slots (17TS). As a result, the 47TS delay circuit 11a and the 17TS delay circuit 11b delay the data of each of the B channels received from the B channel data extracting part 12, and enable loop-back and connection to the B channel data inserting part 13.

The B channel data inserting part 13 inserts the delayed B channel data from the B channel reassembling part 11 and the D channel data from the digital tie line L2 part 14 into the output highway of the B channel data. In other words, the B channel data inserting part 13 inserts the reassembled B channel data and the D channel data into the B channels.

The digital tie line L2 part 14 inserts the generated D channel information with respect to one B channel (B30) transmitted from the B channel data extracting part 12 when transmitting information from its own station or, extracts the installed D channel information with respect to one B channel (30) transmitted from the B channel data extracting part 12 when receiving information from another station. The digital tie line L2 part 14 transmits its output to the B channel data inserting part 13. In other words, the digital tie line L2 part 14 inserts or extracts the D channel information to or from the B channel (B30) so that the D channel information is treated as the ISDN data connection in the ISDN public network 3 and the PBX 2. The insertion and extraction of the D channel information is a process of the layer 2 (L2).

The highway interface circuit 15 exchanges the B channel data between the B channel data extracting part 12 and the B channel data inserting part 13 via the PBX system. The line processor 16 is interposed between the digital tie line L2 part 14 and the CPU 5, and controls the interface loop-back part 1.

Figure 6:
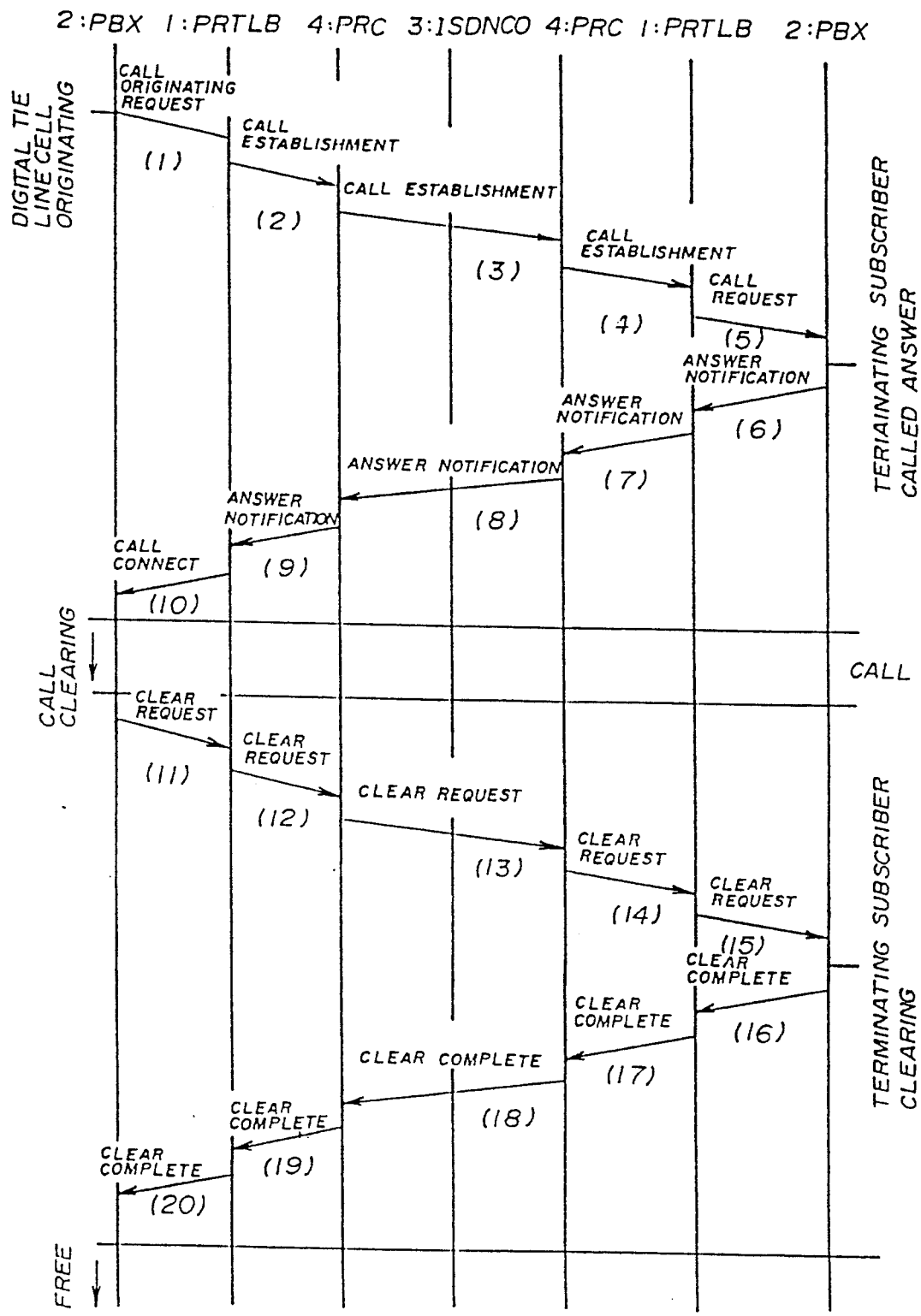
FIG. 6 is a sequence diagram for explaining the flow of D channel information in the embodiment.

According to this embodiment, the flow of the D channel information at the time of call originating becomes as shown in FIG. 6. As indicated by (1) in FIG. 6, when a call originating is made from the PBX system to the tie line, an activate request is made from the CPU 5 of the PBX 2 to the line processor 16 of the interface loop-back part 1. As a result, each part of the interface loop-back part 1 starts to operate, and the D channel information for call out is generated by the digital tie line L2 part 14.

The D channel information which is generated by the digital tie line L2 part 14 is transmitted to the B channel data inserting part 13, and the B channel data inserting part 13 inserts the D channel information into the B channel B30, as indicated by (i) in FIG. 4.

Thereafter, the information of each of the B channels, including the B channel B30 which is inserted with the D channel information, is transmitted to the network of the PBX system via the highway interface circuit 15. The B channel information is transmitted to the PRC 4 via the network of the PBX system as indicated by (2) in FIG. 6, and is further transmitted to the PRC 4 of the remote station side via the ISDN public network 3 as indicated by (3) in FIG. 6. In this state, the PRI is as indicated by (iii) and (iv) in FIG. 4.

The B channel B30 having the D channel information is also connected to the ISDN tie line by the fixed connection function of the main control program. Hence, the D channel information of this B channel B30 is also transmitted to the PBX of the remote station.

At the receiving PBX 2, a termination call which is connected by a similar fixed connection is transmitted to the interface loop-back part 1 as indicated by (4) in FIG. 6. Thereafter, this termination call is connected to the B channel data extracting part 12 via the highway interface circuit 15 of the interface loop-back part 1.

When the information of each of the B channels is transmitted to the B channel data extracting part 12 in the above described manner, the B channel data extracting part 12 extracts groups of B channels respectively made up of the B channels B1 through B14, B16 through B29, and B30. The D channel information which is extracted from the B channel B30 is transmitted to the CPU 5 of the PBX system via the digital tie line L2 part 14, so as to make a call establishment, and the calling of the terminating subscriber (or called subscriber) is made as indicated by (5) in FIG. 6.

When the terminating subscriber answers, the call (or service) is made by notifying the answer to the calling PBX by a reverse process, as indicated by (6) through (10) in FIG. 6. Then, the exchange of the D channel information for the call establishment is made according to the normal ISDN tie line set protocol.

When clearing the call, a clear complete is returned by the receiving end as indicated by (16) through (20) in FIG. 6 in response to a clear request indicated by (11) through (15) in FIG. 6.

As described above, the interface loop-back part 1 includes the B channel data extracting part 12 for individually extracting approximately half the B channel data of the PRI, the B channel data delay part 11 for delaying the B channel data extracted by the B channel data extracting part 12 for the remaining approximately half the PRI, and the B channel data inserting part 13 for inserting the B channel data delayed by the B channel data delay part 11 into the output highway of the B channel data. Furthermore, approximately half the PRI is used as the tie line interface and the remaining part of the PRI is used as the provisional interface for connecting the office line interface. When carrying out the conversion between the tie line interface and the provisional interface, the digital tie line L2 part 14 of the interface loop-back part 1 inserts or extracts the D channel information with respect to one B channel. As a result, the following effects are obtained.

First, it is possible to identify the signal from the connected terminal 7 received via the tie line, and this signal can be converted so that this signal can be treated in the PRC 4 and the ISDN public network 3 similarly as in the case where the signal is received via the office line.

Second, the called side determines whether or not the signal from the transmitting side is received via the office line or the tie line. If it is determined that the signal is received via the tie line, the signal is converted back into the original format and is transmitted to the called terminal 7 as a signal received via the tie line.

Third, the interface loop-back part 1 divides the use of the channels. Approximately half the channels are used for connecting the terminal within the PBX 2, and the remaining channels are used for connecting to the PRI office line via the PBX network.

Fourth, the loop-back connection, that is, the loop-back connection using the reassembling of the B channels of the digital tie line is made, so as to connect the tie line to the PRI office line. In this case, the D channel information is inserted into the B channel. As a result, the tie line is connected to the ISDN public network 3 and the remote PBX 2 via the B channels of the PRI office line. In other words, a control is made to connect the B channels of the digital tie line to the PRC 4, and to connect the D channel to the B channel of the digital office line. Hence, a digital tie line connection is made using the ISDN office line network 3.

Therefore, when connecting the ISDN tie line between the PBXs 2 via the ISDN office line using the PRI of the ISDN, approximately half of the PRI is used as the tie line interface and the remaining approximately half of the PRI is used as the provisional interface for connecting the office line interface, at each PBX 2. In addition, the interface loop-back part 1 is provided to carry out the conversion between the tie line interface and the provisional interface. Accordingly, when using the B channels within the office line, it is possible to control the connection at the PBX 2, thereby making it possible to use the PRI in common between the office line and the tie line. In other words, it is possible to make a digital tie line connection using the ISDN office line network.

As a result, it is unnecessary to set up the digital office line and the tie line by independent equipments, and the line utilization efficiency is improved because it is possible to use the PRI tie line by using the PRI office line in common. Moreover, it is possible to provide inexpensive services because it is unnecessary to set up the digital office line and the tie line by independent equipments.

Of course, any interface loop-back part which carries out the conversion between the tie line interface and the provisional interface for connecting the office line with respect to the PRI may be used as the interface loop-back part 1.

Next, a description will be given of a more detailed construction of the interface loop-back part 1, by referring to FIG. 7.

Figure 7:
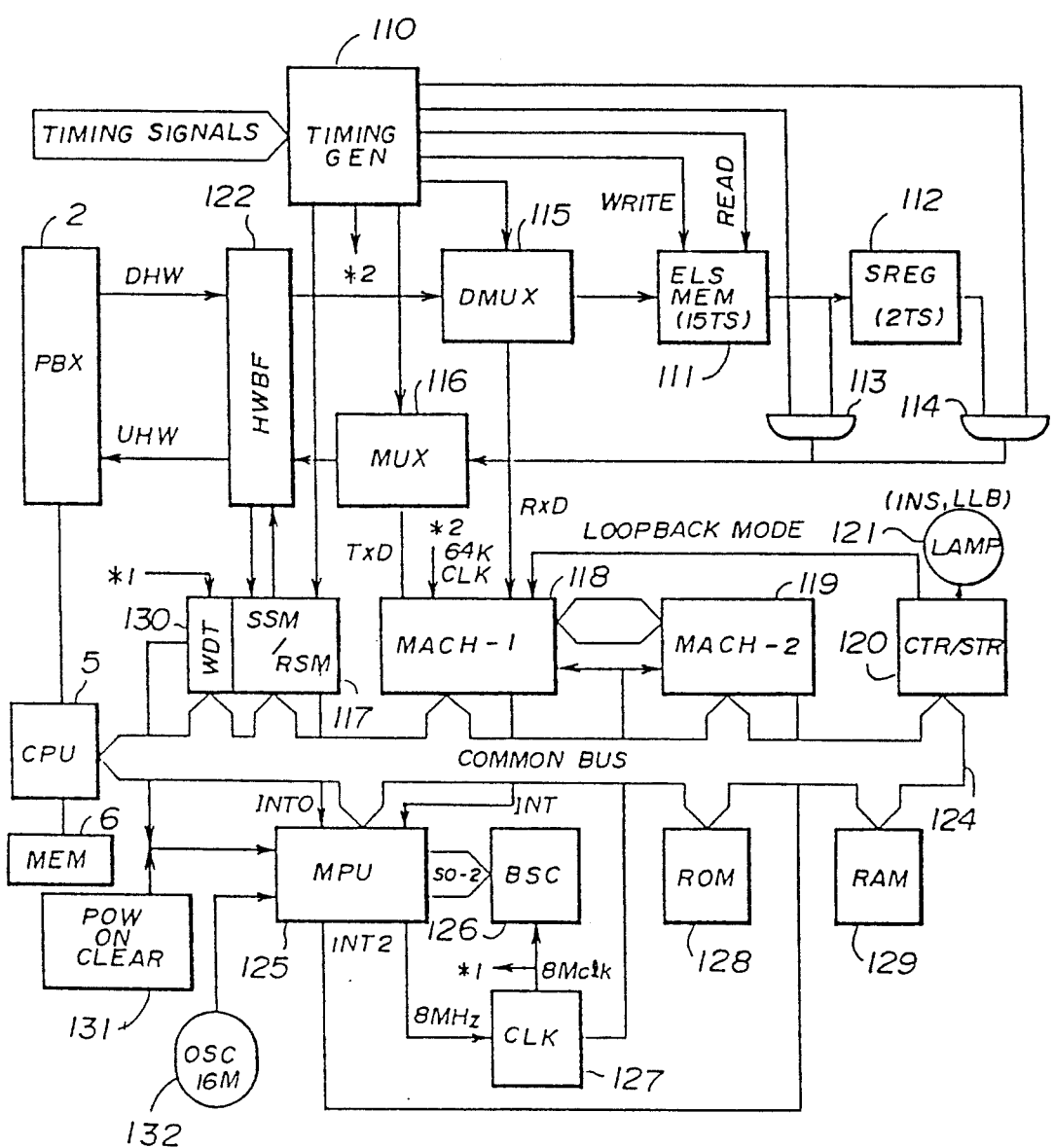
FIG. 7 is a system block diagram showing the interface loop-back part in more detail.

In FIG. 7, a timing generator 110, an elastic memory 111, a shift register 112, and AND circuits 113 and 114 form the B channel data delay part 11 shown in FIG. 5. A demultiplexer 115 forms the B channel data extracting part 12, and a multiplexer 116 forms the B channel data inserting part 13. A sending signal memory/receiving signal memory interface 117, a MACH-1 LSI 118, a MACH-2 LSI 119, a line status register/line control register 120, and a lamp 121 form the digital tie line L2 part 14. A highway buffer 122 forms the highway interface 15. In addition, a microprocessing unit (MPU) 125, a bus controller 126, a clock distributor 127, a read only memory (ROM) 128, a random access memory (RAM) 129, and a watchdog timer 130 form the line processor 16. A common bus 124 couples the digital tie line L2 part 14 and the line processor 16.

The timing generator 110 receives timing signals of the highway and generates time slots and timing signals such as a 64 kHz clock. The demultiplexer 115 carries out a speed conversion of the time slot 29 of the DHW which is used in layer 2 from 2M to 64K, and sends the received D channel information to the MACH-1 LSI 118. The multiplexer 116 carries out a speed conversion of the transmitting D channel information from the MACH-1 LSI 118 from 64K to 2M, and sends the time slot 29 of the UHW which is used in layer 2. The elastic memory 111 can carry out write and read operations independently, and is used to delay the information of the downstream highway by 16 time slots. The shift register 112 further delays the output of the elastic memory 111 by 2 time slots. The highway buffer 122 forms the input/output buffer circuit of the highway.

The sending signal memory/receiving signal memory interface 117 is interposed between the line processor 16 and the CPU 5, and is provided with a 32-byte buffer register in both directions. The MACH-1 LSI 118 carries out operations including disassembling and assembling of the HDLC frame, checking of the frame error, and generating CRC code in conformance with the CCITT Recommendations. The MACH-2 LSI 119 carries out a direct memory access (DMA) control. The line status register/line control register 120 is used as a line state display register and a control register, and the busy display and the setting of the loop-back mode are made via the line status register/line control register 120. The lamp 121 is made up of a light emitting diode (LED), and displays the line state and the operation mode.

The MPU 125 is a 16-bit MPU which operates on a 8 MHz clock. The ROM 128 has 128 Kbytes, for example, and stores the programs. The RAM 129 has 128 Kbytes, for example, and is used for data processing. The bus controller 126 carries out a bus control when the data is exchanged between the MPU 125 and the MACH-1 LSI 118 or the MACH-2 LSI 119 by the DMA. The watchdog timer 130 monitors the runaway of the MPU 125, and resets the MPU 125 when the runaway is detected so as to attempt reactivation of the MPU 125. The clock distributor 127 generates and distributes 8 MHz clock pulses.

A power ON clear part 131 generates a hardware reset signal when the power source is turned ON. An oscillator 132 generates a signal of 16 MHz.

Next, a description will be given of the channel allocation in the above described embodiment, by referring to FIG. 8.

In FIG. 8, (A) shows the channel allocation at the PRC 4 on the side of the ISDN public network 3 in FIG. 3, (B) shows the channel allocation at the PRC 4 on the side of the PBX 2, and (C) shows the channel allocation at the ISDN tie line. The channel allocation at the B channel data extracting part 12 is shown in (D), and the channel allocation at the B channel data inserting part 13 is shown in (E). The reassembling made between (D) and (E) corresponds to the processing in the B channel data delay part 11.

Of course, FIG. 8 merely shows the channel allocation for the described embodiment, and the channel allocation itself is not limited to that shown in FIG. 8.

Further, the present invention is not limited to these embodiments, but various variations and modifications may be made without departing from the scope of the present invention.

What is claimed is:

1. An ISDN tie line connecting system which connects an ISDN tie line between two private branch exchanges via an ISDN office line using an ISDN primary rate interface, said ISDN tie line connecting system comprising:
   a tie line interface connected between the ISDN tie line and each private branch exchange;
   a provisional interface connected between the ISDN office line and each private branch exchange;
   an interface loop-back part, coupled to each private branch exchange, for carrying out a conversion between the tie line interface and the provisional interface with respect to the ISDN primary rate interface, by looping back at least the tie line interface.

2. The ISDN tie line connecting system as claimed in claim 1, wherein said interface loop-back part comprises:
   B channel data extracting means for extracting individual B channel data;
   B channel data delay means, coupled to said B channel data extracting means, for delaying the B channel data extracted by said B channel data extracting means; and
   B channel data inserting means, coupled to said B channel data delay means, for inserting the B channel data delayed by said B channel data delay means into an output highway of the B channel data.

3. The ISDN tie line connecting system as claimed in claim 2, wherein said interface loop-back part further comprises D channel information inserting/extracting means, coupled to said B channel data extracting means and said B channel data inserting means, for inserting or extracting D channel information to or from one B channel when carrying out the conversion between the tie line interface and the provisional interface with respect to the ISDN primary rate interface.

4. The ISDN tie line connecting system as claimed in claim 1, wherein said interface loop-back part comprises D channel information inserting/extracting means for inserting or extracting D channel information to or from one B channel when carrying out the conversion between the tie line interface and the provisional interface with respect to the ISDN primary rate interface.

5. The ISDN tie line connecting system as claimed in claim 1, wherein said interface loop-back part carries out the conversion between the tie line interface and the provisional interface wherein the ISDN primary rate interface provides a plurality of channels and approximately half of the ISDN primary rate interface channels are used in conjunction with the tie line interface and a remaining part of the channels of the ISDN primary rate interface are used in conjunction with the provisional interface.

6. The ISDN tie line connecting system as claimed in claim 5, wherein said interface loop-back part comprises:
   B channel data extracting means for extracting individual B channel data of approximately half of the ISDN primary rate interface;
   B channel data delay means, coupled to said B channel data extracting means, for delaying the B channel data extracted by said B channel data extracting means to a remaining part of the ISDN primary rate interface, and
   B channel data inserting means, coupled to said B channel data delay means, for inserting the B channel data delayed by said B channel data delay means into an output highway of the B channel data.

7. The ISDN tie line connecting system as claimed in claim 6, wherein said interface loop-back part further comprises D channel information inserting/extracting means, coupled to said B channel data extracting means and said B channel data inserting means, for inserting or extracting D channel information to or from one B channel when carrying out the conversion between the tie line interface and the provisional interface with respect to the ISDN primary rate interface.

8. The ISDN tie line connecting system as claimed in claim 5, wherein said interface loop-back part comprises D channel information inserting/extracting means, coupled to said B channel data extracting means and said B channel data inserting means, for inserting or extracting D channel information to or from one B channel when carrying out the conversion between the tie line interface and the provisional interface with respect to the ISDN primary rate interface.

* * * * *